United States Patent
Srivastava

(10) Patent No.: US 10,691,689 B2
(45) Date of Patent: Jun. 23, 2020

(54) AUTOMATIC API FAÇADE GENERATION IN DYNAMIC MULTI-TENANT ENVIRONMENTS

(71) Applicant: The Bank of New York Mellon, New York, NY (US)

(72) Inventor: Kumar S. Srivastava, Mountain View, CA (US)

(73) Assignee: The Bank of New York Mellon, New York, NY (US)

( * ) Notice: Subject to any disclaimer, the term of this patent is extended or adjusted under 35 U.S.C. 154(b) by 193 days.

(21) Appl. No.: 15/868,959

(22) Filed: Jan. 11, 2018

(65) Prior Publication Data

US 2018/0196851 A1   Jul. 12, 2018

Related U.S. Application Data

(60) Provisional application No. 62/445,165, filed on Jan. 11, 2017.

(51) Int. Cl.
| | |
|---|---|
| *G06F 16/00* | (2019.01) |
| *G06F 16/2453* | (2019.01) |
| *G06F 9/54* | (2006.01) |
| *G06F 9/46* | (2006.01) |

(52) U.S. Cl.
CPC ........ *G06F 16/24539* (2019.01); *G06F 9/468* (2013.01); *G06F 9/54* (2013.01)

(58) Field of Classification Search
None
See application file for complete search history.

(56) References Cited

U.S. PATENT DOCUMENTS

| | | | |
|---|---|---|---|
| 9,087,322 B1* | 7/2015 | Graham | G06Q 10/10 |
| 2006/0059155 A1* | 3/2006 | Illg | G06F 21/6209 |
| 2009/0049056 A1* | 2/2009 | Shutt | G06F 16/27 |
| 2014/0280492 A1* | 9/2014 | Yang | A63F 13/00 |
| | | | 709/203 |
| 2015/0188748 A1* | 7/2015 | Watariuchi | H04L 41/046 |
| | | | 709/220 |
| 2017/0171245 A1* | 6/2017 | Lee | G06F 16/86 |

* cited by examiner

*Primary Examiner* — Son T Hoang
(74) *Attorney, Agent, or Firm* — Fenwick & West LLP

(57) ABSTRACT

A dataset management system uses a façade API to automate access to data stores maintained by data tenants. The system receives a configuration request from a data tenant and determines whether the configuration request corresponds to an existing data tenant. If an existing data tenant is identified, the system updates the façade API associated with the existing data tenant based on the configuration request. When a client request for data associated with the data tenant is received, the façade API formats the direct query to include the updated parameters and executes the direct query to retrieve data from the data stores.

14 Claims, 4 Drawing Sheets

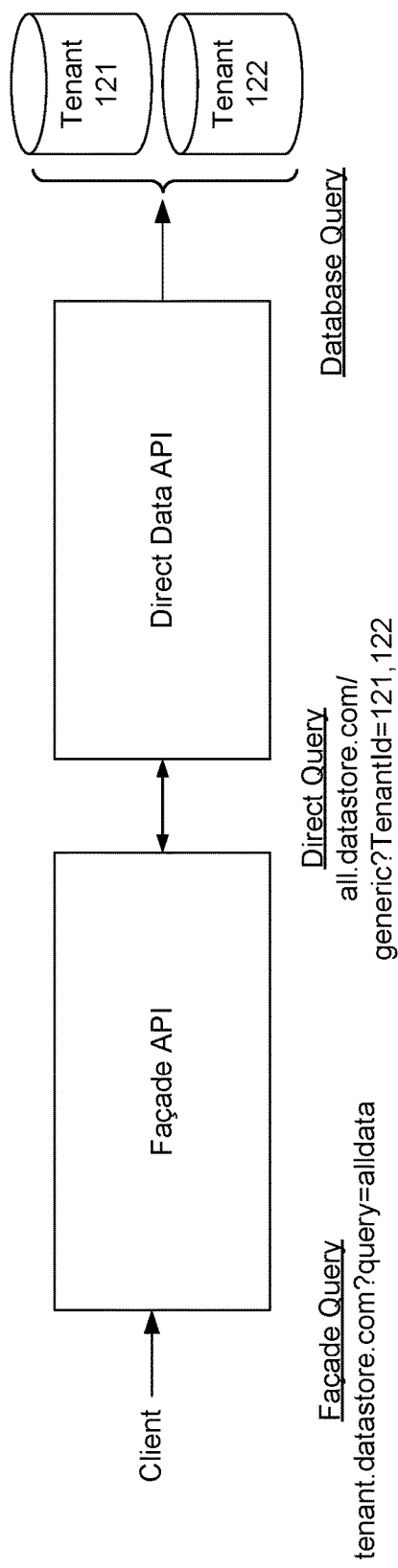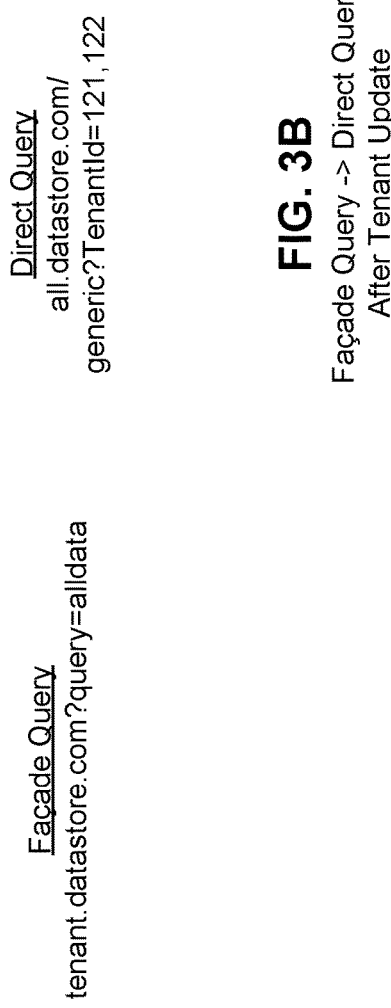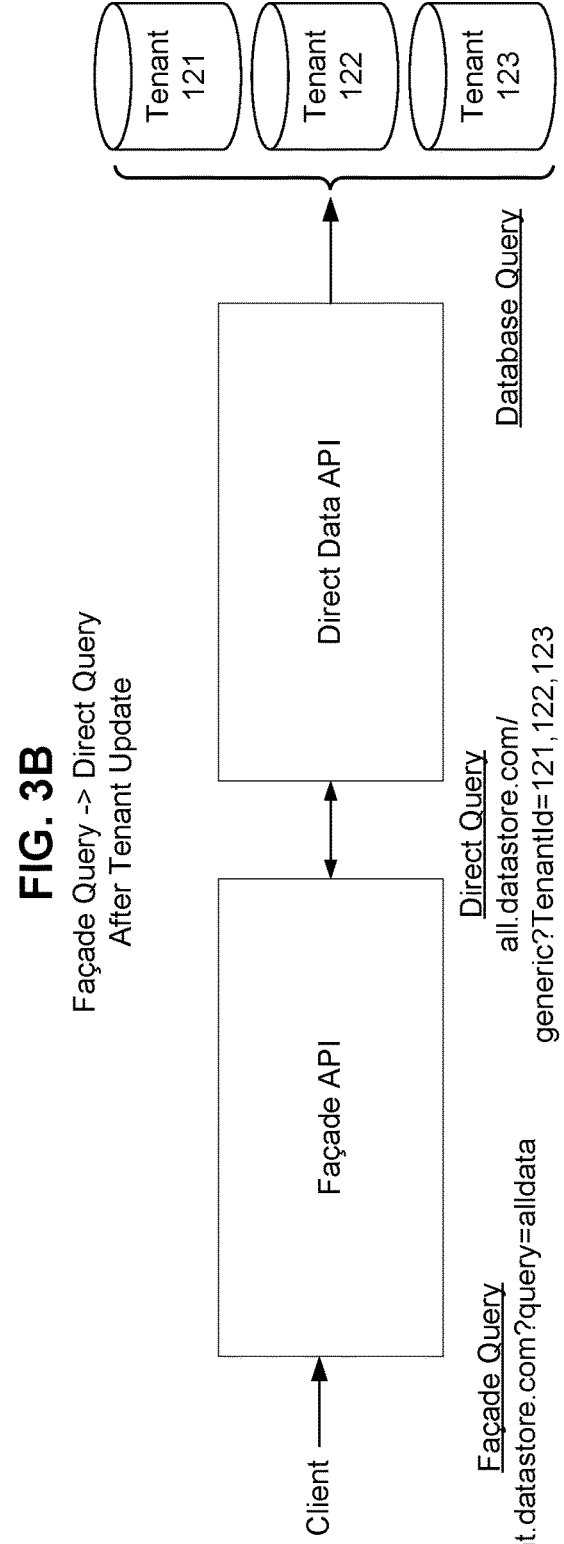

AUTOMATIC API FAÇADE GENERATION IN DYNAMIC MULTI-TENANT ENVIRONMENTS

BACKGROUND

This invention relates generally to data storage systems, and more particularly to automatically generating and modifying façade APIs used in data storage systems.

Data storage systems become increasingly complex as an increasing number of users access and contribute to the data storage system. A contributing user or group of contributing users has access associated with specific privileges to data stores within the data storage system, which allows contributing users to interact with the data storage system by adding or modifying data to the data stores. These contributing users may be associated with a particular entity, such as a business, that operates as a data tenant from the perspective of the data storage system. That is, the data tenant is a "tenant" of the storage system and may store, modify, and access data in the data storage system. Each data tenant is further associated with data tenant characteristics stored as metadata, including tenant identifier, a tenant type, a tenant role, and others. Users of the data storage system may submit queries to the system to retrieve information associated with data stores or specific data tenants.

Contributing users may modify the operating structure of data tenants. For example, when configuring access and data storage by the data storage system, a user might create a new data tenant identifier. The data tenant identifier is typically an identifier of a database or data store for a particular set of data stored by a data tenant and is typically unique to the data tenant or to the data storage system at a whole. In many cases, this user may be unaware of an existing identifier for the data tenant (e.g., for another business group of the user's company) and fail to associate the newly-created identifier with the existing data tenant of the user's company. In another example, an existing data tenant associated with a single tenant identifier might be inadvertently split into two data tenants. This can cause an entity's data to become fragmented across multiple data tenant identifiers and lose an association between the data tenants. Maintaining the availability and service quality of data to users as the data tenant operating structure changes or updates typically relies upon manual updates. Delays in updating modified data tenant information can result in information leakage and loss of service from the associated data stores. In particular, queries for information from data tenants associated with multiple data stores or with different permissions to data stores may result in incomplete results as modifications to the data tenant operating structures are updated and may permit users associated with one data tenant (or data tenant identifier) to improperly access data associated with another.

SUMMARY

When a configuration request is submitted to create or modify a data tenant operating structure, the data storage system automatically generates or identifies a façade API associated with the data tenant. The façade API contains a set of instructions for querying the data stores associated with the data tenant. Queries for information from users are directed to the façade API rather than directly accessing the data stores. The façade API thus provides a set of "endpoints" (e.g., externally accessible functions of the façade API) for users to access and interface with when accessing data for a data tenant. When requests are made via the façade API, the set of instructions designate how to convert the façade API requests to appropriate data store requests, e.g., to specify appropriate data tenant identifiers and parameters. To maintain correct operation of the façade API the data storage system automatically updates the façade API to reflect the changes to the data tenant operating structure by modifying the endpoints or instructions of the façade API.

To implement tenant changes the data storage system receives tenant configuration requests from a user. Users can submit modifications to their associated tenant information by adding new entries or modifying preexisting metadata. In some embodiments, the tenant configuration requests are provided via a configuration or onboarding system, which is monitored to identify the kind and scope of the change made to the data tenant configuration. For example, the modification may create a new data tenant identifier and be identified as relating to an existing data tenant.

Based on the type of change made to the data tenant information, the data storage system determines whether an existing façade API exists for the data tenant or data tenant identifier. An existing data tenant or façade API may be identified as corresponding to a tenant configuration request based on a shared user name or another shared property. The façade API may be modified based on the tenant configuration request and adjust the set of parameters for executing a direct query to the data stores and thereby automatically account for the data tenant modification request. New queries received by the data storage system access the modified façade API and are executed with the updated instructions for accessing the data stores. Thus, the underlying operating structure of the data tenant may be updated along with corresponding modifications to the façade API to permit continuing access the tenant's data without error or delay.

BRIEF DESCRIPTION OF THE DRAWINGS

FIGS. 3A-3B are an example illustrating queries made to a dataset management system before and after modifying a façade API, in accordance with an embodiment.

The figures depict various embodiments for purposes of illustration only. One skilled in the art will readily recognize from the following discussion that alternative embodiments of the structures and methods illustrated herein may be employed without departing from the principles described herein.

DETAILED DESCRIPTION

Figure 1:
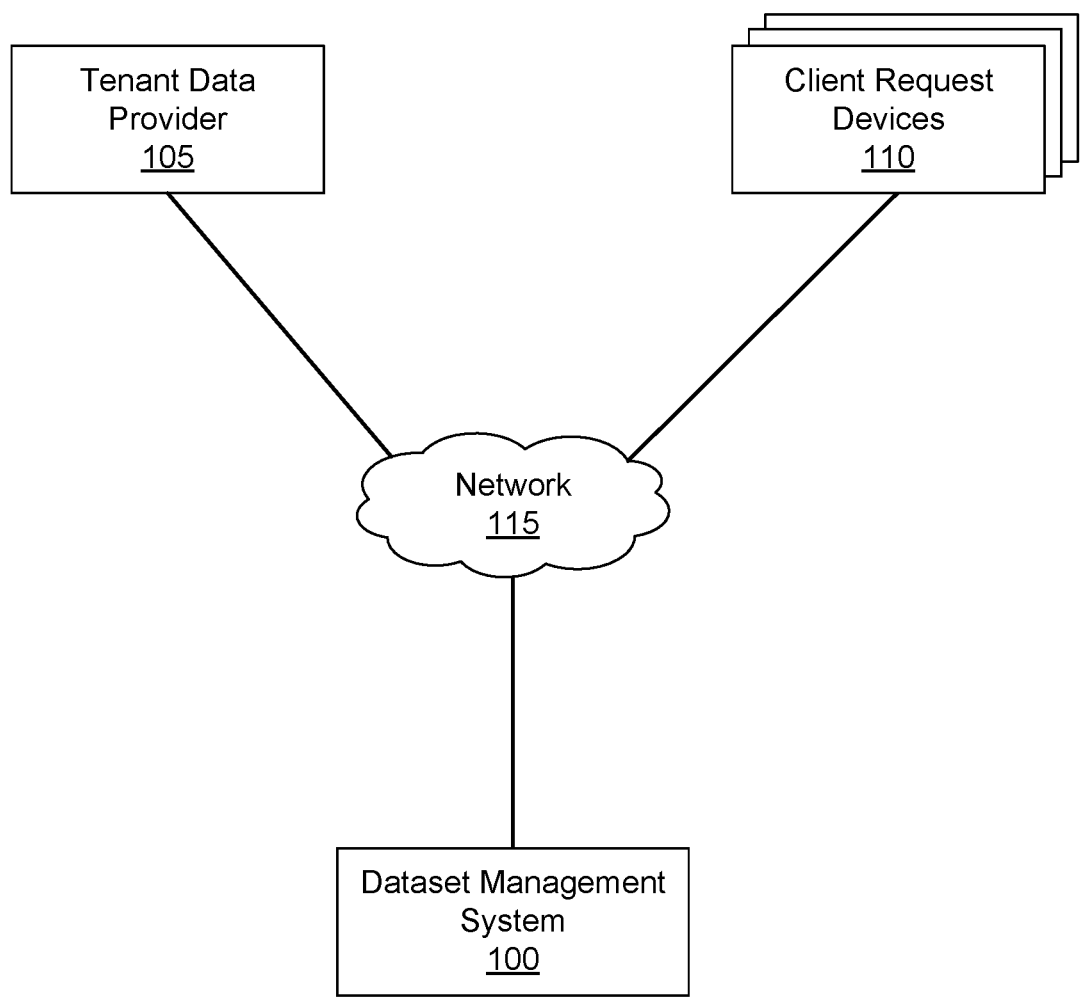
FIG. 1 is a block diagram of a system environment including a dataset management system, in accordance with an embodiment.

FIG. 1 is a high-level block diagram of a system environment for a dataset management system 100, in accordance with some embodiments. FIG. 1 includes a dataset management system 100, which is maintained and updated by data tenants; a tenant data provider 105, which provides data to the dataset management system 100 to store via a network 115; and one or more client devices 110. The client devices 110 can request access to data stored by the dataset management system 100 through a façade API. The façade API is generated and used by the dataset management system 100 to receive requests from clients, customize them according to the configuration of the requested data tenant, and execute the request on the tenant's data.

The dataset management system 100 receives and stores data from data tenants. A data tenant is an account on the dataset management system 100 controlled by a user or entity with certain permissions. For example, these permissions can allow modification, addition, deletion, or access to specific data stores. Data tenants may be associated with various configuration parameters, such as a data tenant type, a data tenant role, and one or more data tenant identifiers. A data tenant type describes a category or group of similar tenants, while a data tenant role describes the position that a data tenant occupies along a supply chain to the client. A data tenant identifier is a unique identifier for a set of data and can be used to indicate a specific data store, contributing user or team of a data tenant, or data source.

Various types of data may be stored by data tenants in the dataset management system 100. Further, the data may be stored in structured or unstructured formats. For example, financial data may be represented as a data stream, where each item is a financial transaction or exchange. In another example, sensor data may be updated as readings are taken. Data can be stored by the dataset management system 100 in a particular format (e.g., SQL or XL databases). In addition to storing data from data tenants, the dataset management system 100 stores metadata associated with data tenants. The metadata includes the data tenant types, roles, and identifiers. Data tenant information may be modified, added, or deleted via configuration requests received by the dataset management system 100.

The tenant data provider 105 provides data via a network 115 to be stored in the dataset management system 100. The tenant data provider 105 additionally provides metadata associated with the data tenant providing the data, so that the data uploaded to the dataset management system is associated with a particular data tenant identifier that can be used to access the data once stored. The identity of the tenant data provider 105 may depend upon the type of data sent to the dataset management system 100. For example, the tenant data provider 105 for financial records or information may be a bank.

The client request device 110 communicates with the dataset management system 100 via a network 115. Client request devices 110 can send requests to access stored data via a façade API. Additionally, client request devices 110 can send configuration requests to the dataset management system 100 to add, update, or delete data tenant information.

The network 115 allows communication between the dataset management system 100, the tenant data provider 105, and the one or more client request devices 110. Any combination of wired and wireless communication channels may be used to pass messages and information between these devices. In one embodiment, the network 115 may be encrypted.

Figure 2:
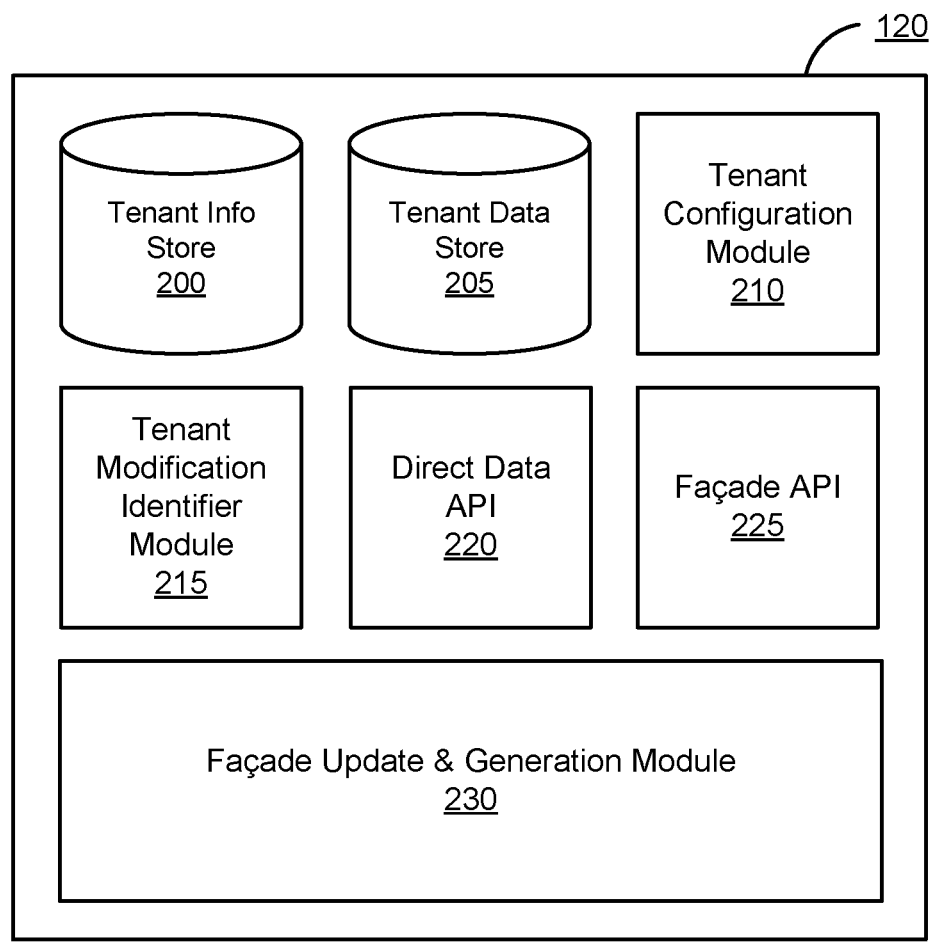
FIG. 2 is a block diagram of an architecture of the dataset management system, in accordance with an embodiment.

FIG. 2 is a block diagram of an architecture of the dataset management system 100, in accordance with some embodiments. The dataset management system 100 configures and stores data tenant information, identifies modifications to the information of a data tenant, and updates façade APIs through which users access tenant data. The system 100 shown in FIG. 2 includes a tenant info store 200, a tenant data store 205, a tenant configuration module 210, a tenant modification identifier module 215, a direct data API 220, a façade API 225, and a façade update and generation module 230. In other embodiments, the system 100 may include additional, fewer, or different components for various applications. Conventional components such as network interfaces, security functions, load balancers, failover servers, management and network operations consoles, and the like are not shown so as not to obscure the details of the system architecture.

Data tenants of the dataset management system 100 are associated with metadata stored in the tenant info store 200. Data stored in the tenant info store 200 includes data tenant identifiers, data tenant types, data tenant roles, and other configuration information related to the data tenant. Because requests to the façade API 225 for data from the dataset management system 100 are frequently received on a per-tenant basis, requests may not designate particular tenant identifiers, roles, or types associated with data tenant metadata and configuration parameters. Accordingly, data stored in the tenant info store 200 may be used to define data tenants' permissions and access to data stores, and additionally to identify similarities between the characteristics of data tenants.

The tenant data store 205 stores the data received from the data tenants in association with an identifier. The data store 205 can be multiple data stores, contain information associated with multiple data tenants, or have a single data store associated with each data tenant identifier. Data stored in the tenant data store 205 can be added and modified by the data tenant, and can additionally be requested and accessed by client request devices 110.

The tenant configuration module 210 receives configuration requests from onboarding tenants. Configuration requests can be associated with new tenants or with previously existing tenants. Additionally, configuration requests can include modifications to a data tenant's role, type, or identifier. In some cases, users configuring a new data tenant may not be aware that the new data tenant configuration request corresponds to an existing data tenant. For example, a data tenant that represents a company may be associated with multiple teams within the company, wherein each team is associated with a different identifier. In this case, a new data tenant identifier may be established with a tenant configuration request, and the system 100 identifies the existing data tenant that corresponds to the tenant configuration request.

The tenant modification identifier module 215 identifies the kind and scope of a change of a configuration request, and additionally identifies if an existing data tenant corresponds to the configuration request based on characteristics of the configuration request and existing data tenants. In one embodiment, an existing data tenant may be identified as a match to a configuration request if the tenant name associated with the modification request matches with the tenant name or names of the existing data tenant. A match may be determined based on a threshold similarity score generated for the configuration request and the existing data tenant. In another embodiment, an existing data tenant may be identified as a match to a configuration request based on a matching user or administrator making a request to connect the existing data tenant to the configuration request. In other embodiments, the tenant modification identifier module 215 may retroactively determine matches among existing data tenants based on whether they are jointly queried via the façade API. In cases where no existing data tenant is found to correspond to the configuration request, the tenant modification identifier module 215 indicates to the façade update and generation module 230 that a new façade API should be generated for the new data tenant. The tenant modification identifier module 215 additionally identifies when a configuration request indicates modifying the metadata associated with a data tenant (e.g., an additional tenant identifier to be queried for a data tenant; a modification to the type or role of the tenant).

The direct data API 220 receives queries from the façade API, formatted to include specific identifiers, roles, and types to access the appropriate data in the dataset management system. Based on the formatted query, the direct data API retrieves data from the data stores and returns it to the façade API to be delivered to the client. The direct data API can access metadata in the tenant info store 200 or user stored data in the tenant data store 205.

The façade API 225 is a client-side interface that receives queries to retrieve data associated with data tenants. A façade API 225 contains a set of parameters for formatting a direct query to the direct data API 220, which then retrieves data from the data stores. In one embodiment, the façade API 225 stores parameters in the form of endpoints, externally accessible functions of the façade API, which can be modified to accommodate modifications made via configuration requests.

FIG. 3A illustrates an example of a user query to a façade API 225. A client communicates via a client request device 110 with the façade API 225 to transmit a façade query for all data associated with a tenant of the data store. The façade API 225 formats the façade query into a direct query based on parameters contained within the façade API 225, requesting access to all data of a data store associated with tenant identifiers 121 and 122. This is transmitted to the direct data API 220, which queries the data stores associated with tenant identifiers 121 and 122. The retrieved information is then sent back to the façade API for the client to access. In other embodiments, the formatted queries may contain other metadata associated with the data tenant, such as the tenant role or tenant type, by which the data retrieved from the data stores may be filtered.

Returning to FIG. 2, the façade update and generation module 230 receives changes from the tenant modification identifier module 215. Based on the kind and scope of a change of a configuration request, the façade update and generation module 230 may modify the parameters of an existing façade API associated with the same data tenant as the configuration request or may generate a new façade API for a new data tenant with no existing corresponding façade API. For example, the façade update and generation module 230 may add an endpoint to a preexisting façade API upon receiving a configuration request to add a new identifier to an existing data tenant. In another example, the façade update and generation module 230 may remove one or more endpoints in a façade API upon receiving a configuration request to combine two or more identifiers into a composite identifier. In other examples, the façade update and generation module 230 may modify the type or role of a data tenant, which may influence the permissions associated with the data tenant.

FIG. 3B illustrates an example of a user query to a façade API 225 after a configuration request is made by a data tenant to add a tenant identifier 123 to an existing data tenant. The parameters of the façade API 225 are updated to include an endpoint for the 123 identifier. When a client sends a façade query for all data associated with the data tenant to the façade API 225, the façade API 225 now formats the direct query to include the 123 identifier before sending the direct query to the direct data API 220. Thus, when the direct data API 220 accesses the data stores based on the received direct query, it retrieves data from data stores associated with tenant identifiers 121, 122, and 123. This data is then returned to the façade API to be delivered to the client. In another example, wherein a configuration request is made to modify the role of the data tenant to a role M, the updated façade API formats the direct query to filter the queried data by role (e.g., "all.datastore.com/generic?TenantID=121,122&role=M"). Similarly, in an example where a configuration request is made to modify the type of the data tenant to a type N, the updated façade API formats the direct query to filter the queried data by type (e.g., "all.datastore.com/generic?TenantID=121,122&role=N").

Figure 4:
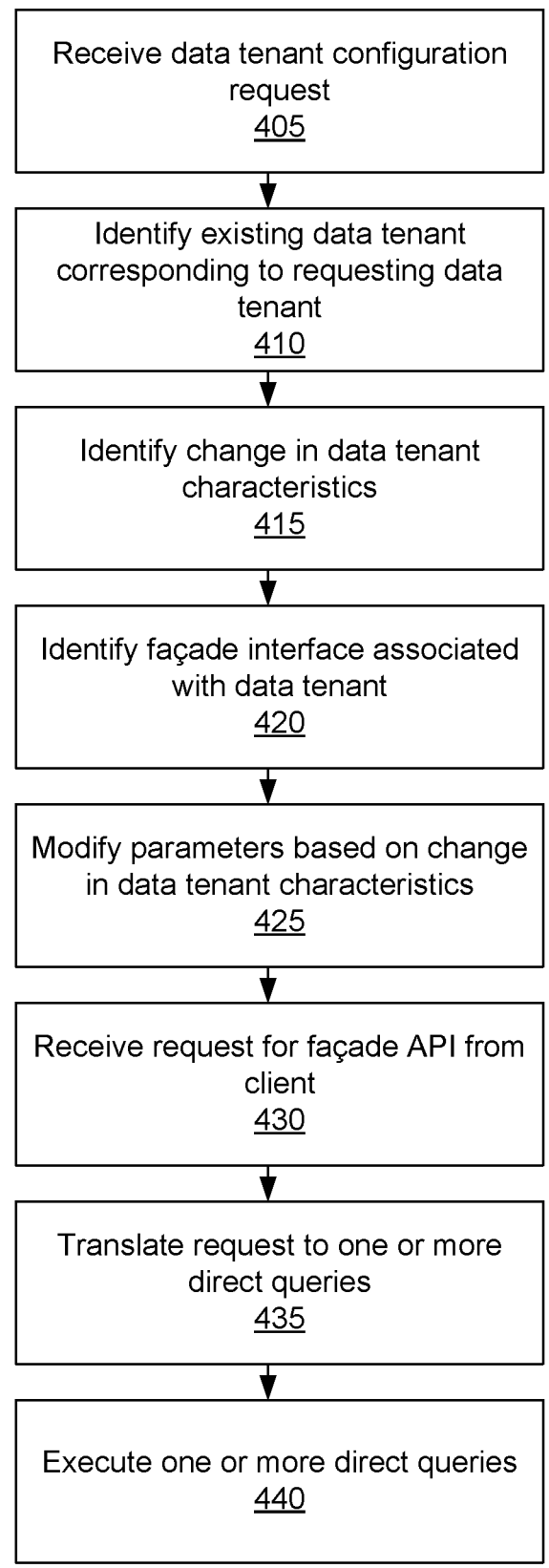
FIG. 4 is a flow chart illustrating a method of automatically modifying a façade API, in accordance with an embodiment.

FIG. 4 is a flow chart illustrating a method of automatically modifying a façade API, in accordance with an embodiment. The tenant configuration module 210 receives a data tenant configuration request 405. Based on metadata associated with existing data tenants and information provided in the configuration request, the tenant modification identifier module 215 identifies an existing data tenant corresponding to the requesting data tenant 410. When an existing data tenant is identified, the tenant modification identifier module 215 identifies changes in the data tenant characteristics 415 represented by the configuration request and identifies the façade interface associated with the data tenant 420. The façade update and generation module 230 then modifies the parameters of the façade interface 425 based on the change in the data tenant characteristics.

When the façade API 225 receives a request from a client 430, the façade API 225 translates the request to one or more direct queries 435 based on the modified parameters. The one or more direct queries are executed 440 to retrieve information from the dataset management system 100.

CONCLUSION

The foregoing description of the embodiments has been presented for the purpose of illustration; it is not intended to be exhaustive or to limit the patent rights to the precise forms disclosed. Persons skilled in the relevant art can appreciate that many modifications and variations are possible in light of the above disclosure.

Some portions of this description describe the embodiments in terms of algorithms and symbolic representations of operations on information. These algorithmic descriptions and representations are commonly used by those skilled in the data processing arts to convey the substance of their work effectively to others skilled in the art. These operations, while described functionally, computationally, or logically, are understood to be implemented by computer programs or equivalent electrical circuits, microcode, or the like. Furthermore, it has also proven convenient at times, to refer to these arrangements of operations as modules, without loss of generality. The described operations and their associated modules may be embodied in software, firmware, hardware, or any combinations thereof.

Any of the steps, operations, or processes described herein may be performed or implemented with one or more hardware or software modules, alone or in combination with other devices. In one embodiment, a software module is implemented with a computer program product comprising a computer-readable medium containing computer program code, which can be executed by a computer processor for performing any or all of the steps, operations, or processes described.

Embodiments may also relate to an apparatus for performing the operations herein. This apparatus may be specially constructed for the required purposes, and/or it may comprise a general-purpose computing device selectively activated or reconfigured by a computer program stored in the computer. Such a computer program may be stored in a non-transitory, tangible computer readable storage medium, or any type of media suitable for storing electronic instructions, which may be coupled to a computer system bus. Furthermore, any computing systems referred to in the specification may include a single processor or may be architectures employing multiple processor designs for increased computing capability.

Embodiments may also relate to a product that is produced by a computing process described herein. Such a product may comprise information resulting from a computing process, where the information is stored on a non-transitory, tangible computer readable storage medium and may include any embodiment of a computer program product or other data combination described herein.

Finally, the language used in the specification has been principally selected for readability and instructional purposes, and it may not have been selected to delineate or circumscribe the patent rights. It is therefore intended that the scope of the patent rights be limited not by this detailed description, but rather by any claims that issue on an application based hereon. Accordingly, the disclosure of the embodiments is intended to be illustrative, but not limiting, of the scope of the patent rights, which is set forth in the following claims.

What is claimed is:

1. A method, performed by a management server of a multi-tenant environment, for automating access to a data store system comprising multiple tenant data stores, each tenant data store being associated with a tenant of the multi-tenant environment, the method comprising:
    receiving a configuration request from a tenant;
    identifying an existing tenant data store corresponding to the tenant that submitted the configuration request;
    determining properties of the existing tenant data store in the configuration request;
    determining a change in the properties associated with the existing tenant data store by comparing the properties of the existing tenant data store with properties included in the configuration request;
    identifying a façade application program interface (API) associated with the existing tenant data store, the façade API having a set of parameters for executing one or more direct queries to the data store to access the existing tenant data store, the direct queries based on façade queries received at the façade API;
    modifying the set of parameters of the façade API based on the determined change in properties associated with the existing tenant data store;
    receiving a façade query at the façade API from a user associated with the tenant;
    translating the received façade query to one or more of the direct queries, the translation based on the modified set of parameters; and
    executing the one or more direct queries on the data store.

2. The method of claim 1, wherein the change in the properties associated with the existing tenant data store includes an additional tenant identifier for the tenant data store.

3. The method of claim 1, wherein identifying the existing tenant data store corresponding to the tenant that submitted the configuration request comprises:
    accessing characteristics associated with the existing data tenant;
    identifying a tenant name associated with the existing data tenant, the tenant name of the existing data tenant and the tenant name of the tenant that submitted the configuration request used to generate a similarity score; and
    responsive to the similarity score exceeding a threshold value, making the identification.

4. The method of claim 1, wherein identifying the existing tenant data store corresponding to the tenant configuration request comprises identifying common users across tenants.

5. The method of claim 1, wherein the change in the properties associated with the existing tenant data store includes a modification to a role of the tenant.

6. The method of claim 1, wherein the change in the properties associated with the existing tenant data store includes a modification to a type of the tenant.

7. The method of claim 1, wherein the change in the properties associated with the existing tenant data store includes a modification to an identifier of the tenant.

8. A non-transitory computer-readable storage medium storing computer program instructions executable by a processor of a management server of a multi-tenant environment to perform operations for automating access to a data store system comprising multiple tenant data stores, each tenant data store being associated with a tenant of the multi-tenant environment, the operations comprising:
    receiving a configuration request from a tenant;
    identifying an existing tenant data store corresponding to the tenant that submitted the configuration request;
    determining properties of the existing tenant data store in the configuration request;
    determining a change in the properties associated with the existing tenant data store by comparing the properties of the existing tenant data store with properties included in the configuration request;
    identifying a façade application program interface (API) associated with the existing tenant data store, the façade API having a set of parameters for executing one or more direct queries to the data store to access the existing tenant data store, the direct queries based on façade queries received at the façade API;
    modifying the set of parameters of the façade API based on the determined change in properties associated with the existing tenant data store;
    receiving a façade query at the façade API from a user associated with the tenant;
    translating the received façade query to one or more of the direct queries, the translation based on the modified set of parameters; and
    executing the one or more direct queries on the data store.

9. The computer-readable storage medium of claim 8, wherein the change in the properties associated with the existing tenant data store includes an additional tenant identifier for the tenant data store.

10. The computer-readable storage medium of claim 8, wherein identifying the existing tenant data store corresponding to the tenant that submitted the configuration request comprises:
    accessing characteristics associated with the existing data tenant;
    identifying a tenant name associated with the existing data tenant, the tenant name of the existing data tenant and the tenant name of the tenant that submitted the configuration request used to generate a similarity score; and
    responsive to the similarity score exceeding a threshold value, making the identification.

11. The computer-readable storage medium of claim 8, wherein identifying the existing tenant data store corresponding to the tenant configuration request comprises identifying common users across tenants.

12. The computer-readable storage medium of claim 8, wherein the change in the properties associated with the existing tenant data store includes a modification to a role of the tenant.

13. The computer-readable storage medium of claim 8, wherein the change in the properties associated with the existing tenant data store includes a modification to a type of the tenant.

14. The computer-readable storage medium of claim 8, wherein the change in the properties associated with the existing tenant data store includes a modification to an identifier of the tenant.

* * * * *